July 29, 1969  C. C. FOX  3,457,656
LAUNDRY APPARATUS

Filed Nov. 9, 1967  2 Sheets-Sheet 1

WITNESSES

INVENTOR
Clyde C. Fox
BY
AGENT

July 29, 1969     C. C. FOX     3,457,656

LAUNDRY APPARATUS

Filed Nov. 9, 1967     2 Sheets-Sheet 2

United States Patent Office 3,457,656
Patented July 29, 1969

3,457,656
LAUNDRY APPARATUS
Clyde C. Fox, Mansfield, Ohio, assignor to Westinghouse Electric Corporation, Pittsburgh, Pa., a corporation of Pennsylvania
Filed Nov. 9, 1967, Ser. No. 681,842
Int. Cl. F26b *11/04*
U.S. Cl. 34—133      5 Claims

ABSTRACT OF THE DISCLOSURE

Bearing structure and support assembly. A metallic shaft carried by a rotating member is provided with a spherical end captivated in a support bearing affixed to a stationary wall. The support bearing is a single piece molded member having an open top and side wall for insertion of the spherical end of the shaft and for protrusion of the shaft, respectively. The bearing seat has a configuration compatible with that of the spherical end which renders the bearing self-aligning and the support suitable for holding lubrication.

Background of the invention

This invention relates, in general, to clothes drying apparatus and, more particularly, to support bearing structure for use therein.

Heretofore, bearing structures used in domestic clothes dryers have been expensive to manufacture, due to a large extent, the number of parts, dictated by the design. Conventional structures comprise a shaft carried by the rotating basket and a powdered metal bearing supported by a stationary wall of the dryer. Because of the bearing design, front and rear supports are required which must be fastened together and, then as an assembly, to the stationary wall. The free end of the shaft must be tapped to accommodate the necessary fastener for holding the shaft in the bearing. Additionally, the internal wall of the bearing must be provided with a groove for holding a lubricating pad.

Holding close manufacturing tolerances is a necessity in bearing constructions of this type to insure quiet operation and to prevent premature failure of parts. This is another factor which increases the cost.

Accordingly, the general object of this invention is to provide new and improved clothes drying apparatus.

It is a more particular object of this invention to provide, in a clothes dryer, new and improved bearing and bearing support structure.

Summary of the invention

Briefly, the present invention accomplishes the above-cited objects by providing the shaft carried by the rotating basket of the dryer with a spherical end which is insertable into a support bearing attached to a fixed wall. The support bearing has a top opening through which the spherical end of the shaft is inserted and a slot or opening in a vertical wall thereof through which the main part of the shaft extends. The width of the vertical slot is less than the diameter of the spherical end of the shaft so as to prevent axial movement of the basket.

Further objects and advantages of the present invention will become more apparent when considered in view of the following detailed description and drawings.

Description of the preferred embodiment

Figure 1:
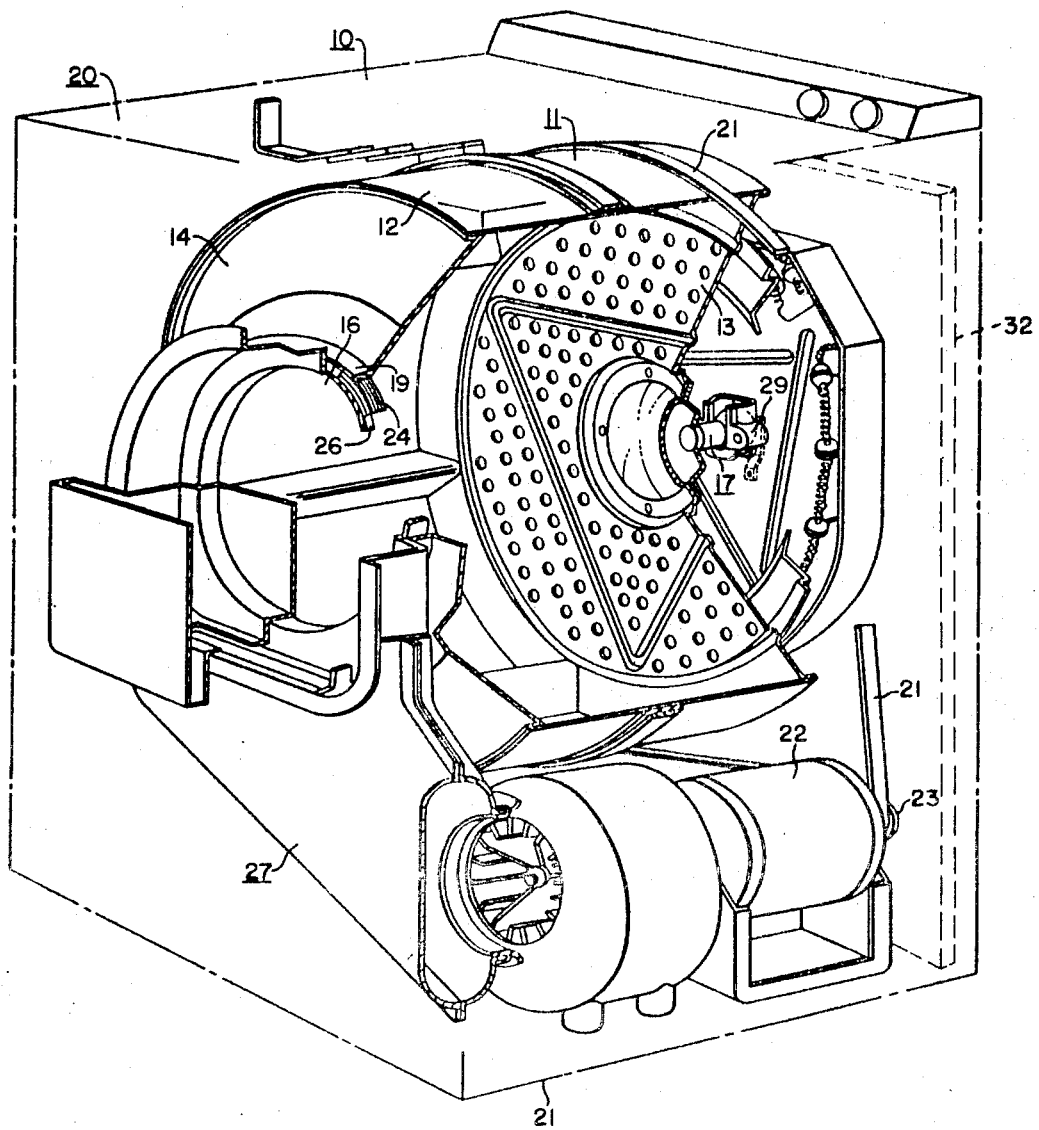
FIGURE 1 is a perspective view, partly broken away, of a clothes dryer incorporating the new and improved bearing support structure.

Referring now to the drawings, especially FIG. 1, reference character 10 designates generally a domestic clothes dryer comprising a clothes basket or drum 11 having a generally cylindrical shape and including an imperforate annular wall 12 and a perforate rear wall 13 opposite a somewhat conical-shaped front wall 14. The front wall 14 has an opening 16 providing access to the interior of the drum 11 for insertion or removal of clothes.

A shaft structure 17, secured by a rivet 15 to a shaft support 18 mounted on the rear wall 13, along with an extruded annular flange 19 forming the opening 16, serve to support the drum 11 for rotation about a substantially horizontal axis within a frame or cabinet 20.

The drum 11 is rotated by means of a flat drive belt 21 encircling the annular wall 12. Power from a conventional motor 22 is transmitted to the belt 21 through a pulley 23 fixed to one end of the output shaft of the motor 22. Support for the front end of the drum 11 is provided by a pair of bearing pads 24, only one being shown, mounted on an annular flange 26 of a combination front baffle and air duct assembly 27 supported by a front panel of the dryer 10.

Figure 2:
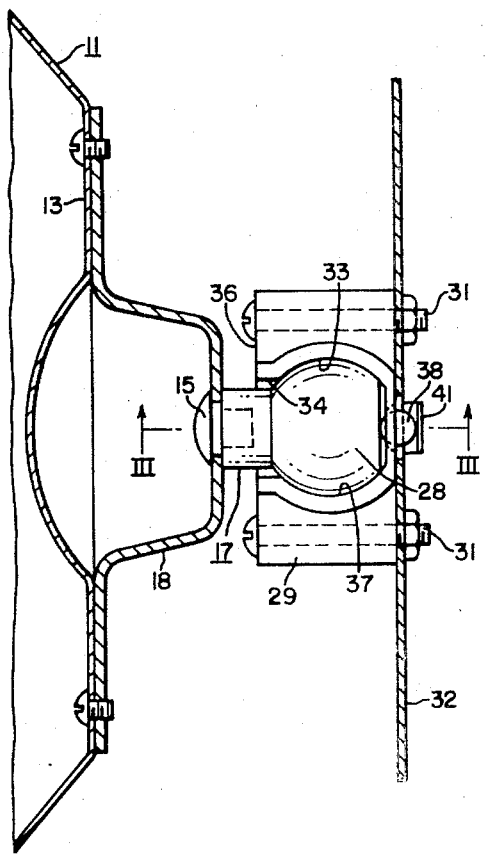
FIG. 2 is a top plan view of bearing support structure forming a primary part of the invention.
Figure 3:
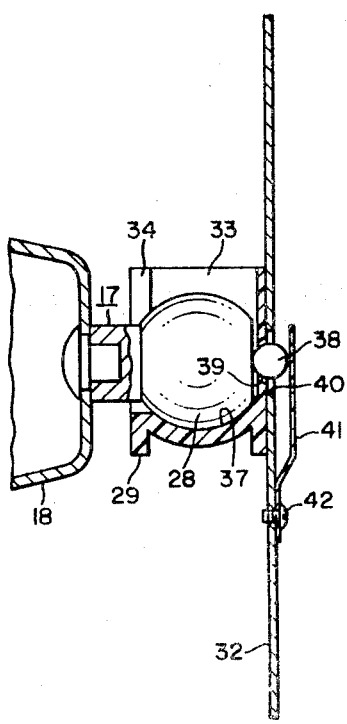
FIG. 3 is a cross-sectional view taken on the line III—III of FIG. 2.

The shaft structure 17 comprises a spherical end 28, see FIGS. 2 and 3 which is carried in a support bearing structure 29 mounted by means of suitable fasteners 31 to a stationary rear wall 32 of the dryer 10. The support bearing 29 has a top opening 33 into which the spherical end 28 is inserted upon installation of the drum 11. An elongated opening 34 in a vertical wall 36 of the support bearing allows the extension of the shaft portion of bearing 17 from the support. The width of the opening is somewhat less than the diameter of the spherical end 28 in order to prevent excessive axial movement of the basket.

The support bearing 29 molded from any suitable material, for example, plastic, has a bearing seat 37 having a substantially hemispherical configuration so that it is compatible with the spherical end 28. It will be appreciated that the configuration of the seat 37 makes it suitable for containing lubricants, not shown. To enhance the structure for this purpose the surface of the bearing seat 37 may be made irregular to act as a reservoir.

A metallic ball 38 contacting the metallic shaft structure 17 through a pair of apertures 39 and 40 in the support bearing 29 and the rear wall 32, respectively, completes an electrically conducting path from the drum 11 to a grounding spring 41 secured to the rear wall 32 by a screw 42. Static charge build-up on the drum 11 is thereby provided with a discharge path to ground.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim:

1. In a machine for drying clothes including cabinet structure and a drum disposed for rotation therein, means supporting said drum for rotation about a substantially horizontal axis, said support means comprising: shaft means having one end thereof supported by the rear wall of said drum, bearing structure supported by the rear wall of said cabinet structure in substantial axial alignment with said shaft means, said bearing structure having a seat portion and a top opening communicating therewith for receiving at least a portion of said shaft means, said shaft means having at least two diameters and said bearing structure having an elongated opening substantially perpendicular to said top opening and in the wall thereof nearest said drum, the portion of said shaft means received in said top opening having a greater dimension than that of said last-mentioned opening whereby said shaft means is operatively retained in said bearing structure, the portion of said shaft means disposed in said bearing structure has a substantially spherical shape and said bearing seat has a complementary configuration whereby said shaft means is self-aligning.

2. Structure as specified in claim 1, wherein said bearing structure comprises an integrally molded plastic construction.

3. Structure as specdified in claim 2, wherein said bearing structure has an aperture through the wall thereof adjacent the rear wall of said cabinet structure, electrically conducting means providing an electrostatic discharge path from said shaft to said rear wall of said cabinet structure through said aperture.

4. In a clothes dryer having cabinet structure and rotatable drum disposed therein, means supporting said drum for rotation about a substantially horizontal axis, said support means comprising a shaft carried by the rear wall of said drum, integral bearing and bearing support structure carried by the rear wall of said cabinet structure and adapted to support the free end of said shaft, said structure being provided with a top opening and bearing seat, said shaft being received in said seat through said top opening, the free end of said shaft being substantially spherical and said bearing seat having a complementary configuration whereby said shaft means is self-aligning.

5. Structure as specified in claim 4, wherein said structure has an elongated opening communicating with and perpendicular to said top opening, the transverse dimension of said opening being less than the diameter of said substantially spherical free end of said shaft.

References Cited
UNITED STATES PATENTS

| | | | |
|---|---|---|---|
| 2,851,793 | 9/1958 | Thompson | 34—133 |
| 3,320,678 | 5/1967 | Berke | 34—133 XR |
| 3,331,141 | 7/1967 | Jacobs et al. | 34—133 |

KENNETH W. SPRAGUE, Primary Examiner